United States Patent
Gilfix et al.

(10) Patent No.: US 7,386,892 B2
(45) Date of Patent: Jun. 10, 2008

(54) METHOD AND APPARATUS FOR DETECTING PASSWORD ATTACKS USING MODELING TECHNIQUES

(75) Inventors: Michael Gilfix, Austin, TX (US); Foluso Olaiya Okunseinde, Austin, TX (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 10/621,928

(22) Filed: Jul. 17, 2003

(65) Prior Publication Data

US 2005/0015614 A1 Jan. 20, 2005

(51) Int. Cl.
*G06F 7/04* (2006.01)
*H04K 1/00* (2006.01)
(52) U.S. Cl. .......................... 726/28; 713/184
(58) Field of Classification Search ...................... None
See application file for complete search history.

(56) References Cited

U.S. PATENT DOCUMENTS

| | | | | |
|---|---|---|---|---|
| 4,621,334 | A | | 11/1986 | Garcia .................... 364/550 |
| 4,805,222 | A | | 2/1989 | Young et al. ................ 382/2 |
| 5,303,299 | A | | 4/1994 | Hunt et al. ................. 379/88 |
| 5,557,686 | A | * | 9/1996 | Brown et al. ............... 382/115 |
| 5,761,329 | A | * | 6/1998 | Chen et al. ................. 382/116 |
| 6,442,692 | B1 | * | 8/2002 | Zilberman ................. 713/184 |
| 2002/0029341 | A1 | * | 3/2002 | Juels et al. ................ 713/184 |
| 2002/0120592 | A1 | * | 8/2002 | Juels et al. ................. 706/8 |
| 2002/0133721 | A1 | | 9/2002 | Adjaoute .................... 713/201 |
| 2002/0152034 | A1 | | 10/2002 | Kondo et al. ................ 702/19 |

OTHER PUBLICATIONS

Monrose et al., "Password Hardening Based On Keystroke Dynamics", IJIS (2001) V.1, pp. 1-15, Sep. 17, 2001.
Tzong-Chen, Remote Login Authentication Scheme Based Upon a Geometric Approach, Dept. of Inforamtion Management, National Taiwan Institute of Technology, Dec. 1995.
Timing Analysis of Keystrokes and Timing Attacks on SSH, Dawn Xiaodong Song, David Wagner, Xuqing Tian.
Fabian Monrose, Aviel Rubin, Authentication via Keystroke Dynamics.

* cited by examiner

*Primary Examiner*—Nasser Moazzami
*Assistant Examiner*—Brandon S Hoffman
(74) *Attorney, Agent, or Firm*—Justin M. Dillon; Gregory K. Goshorn; Greg Goshorn, P.C.

(57) ABSTRACT

Provided is an apparatus and method for detecting fraudulent passwords so that computer break-in attempts can be distinguished from authorized users incorrectly entering their passwords. An actual password is mapped against a computer keyboard and the resultant data is stored in memory. The profile of an entered password is compared to the stored profile. If the profile of the entered password differs significantly from the stored profile, then the login attempt is flagged as an attempted intrusion. In one embodiment of the current invention, passwords are mapped according to the distance subsequent keystrokes are from each other. Different embodiments may have different mapping schemes. For example, mapping data may correspond to statistical data that corresponds to the likelihood that a particular character is typed by mistake when another character is intended.

5 Claims, 6 Drawing Sheets

|   | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| A | 0 | 5 | 3 | 2 | 2 | 3 | 4 | 5 | 7 | 6 | 7 | 8 | 7 | 6 | 8 | 9 | 1 | 3 | 1 | 4 | 6 | 4 | 1 | 2 | 5 | 1 |
| B | 5 | 0 | 2 | 3 | 4 | 2 | 1 | 1 | 3 | 2 | 3 | 4 | 2 | 1 | 4 | 5 | 6 | 3 | 4 | 2 | 2 | 1 | 5 | 3 | 2 | 4 |
| C | 3 | 2 | 0 | 1 | 2 | 1 | 2 | 3 | 5 | 4 | 5 | 6 | 4 | 3 | 6 | 7 | 4 | 2 | 2 | 4 | 1 | 3 | 1 | 3 | 2 |   |
| D | 2 | 3 | 1 | 0 | 1 | 1 | 2 | 3 | 5 | 4 | 5 | 6 | 5 | 4 | 6 | 7 | 3 | 1 | 1 | 2 | 4 | 2 | 2 | 1 | 3 | 2 |
| E | 2 | 4 | 2 | 1 | 0 | 2 | 3 | 4 | 5 | 5 | 6 | 7 | 6 | 5 | 6 | 7 | 2 | 1 | 1 | 2 | 4 | 3 | 1 | 2 | 3 | 2 |
| F | 3 | 2 | 1 | 1 | 2 | 0 | 1 | 2 | 4 | 3 | 4 | 5 | 4 | 3 | 5 | 6 | 4 | 1 | 2 | 1 | 3 | 1 | 3 | 2 | 2 | 3 |
| G | 4 | 1 | 2 | 2 | 3 | 1 | 0 | 1 | 3 | 2 | 3 | 4 | 3 | 2 | 4 | 5 | 5 | 2 | 3 | 1 | 2 | 1 | 4 | 3 | 1 | 3 |
| H | 5 | 1 | 3 | 3 | 4 | 2 | 1 | 0 | 2 | 1 | 2 | 3 | 2 | 1 | 3 | 4 | 6 | 3 | 4 | 2 | 1 | 2 | 5 | 4 | 1 | 5 |
| I | 7 | 3 | 5 | 5 | 5 | 4 | 3 | 2 | 0 | 1 | 1 | 2 | 2 | 2 | 1 | 2 | 7 | 4 | 6 | 4 | 1 | 4 | 6 | 6 | 2 | 7 |
| J | 6 | 2 | 4 | 4 | 5 | 3 | 2 | 1 | 1 | 0 | 1 | 2 | 1 | 1 | 2 | 3 | 7 | 4 | 5 | 3 | 1 | 3 | 6 | 5 | 2 | 6 |
| K | 7 | 3 | 5 | 5 | 6 | 4 | 3 | 2 | 1 | 1 | 0 | 1 | 1 | 2 | 1 | 2 | 8 | 5 | 6 | 4 | 2 | 4 | 7 | 6 | 3 | 7 |
| L | 8 | 4 | 6 | 6 | 7 | 5 | 4 | 3 | 2 | 2 | 1 | 0 | 2 | 3 | 1 | 1 | 9 | 6 | 7 | 5 | 3 | 5 | 8 | 7 | 4 | 8 |
| M | 7 | 2 | 4 | 5 | 6 | 4 | 3 | 2 | 2 | 1 | 1 | 2 | 0 | 1 | 2 | 3 | 8 | 5 | 6 | 4 | 2 | 3 | 7 | 5 | 3 | 6 |
| N | 6 | 1 | 3 | 4 | 5 | 3 | 2 | 1 | 2 | 1 | 2 | 3 | 1 | 0 | 3 | 4 | 7 | 4 | 5 | 3 | 2 | 2 | 6 | 4 | 2 | 5 |
| O | 8 | 4 | 6 | 6 | 6 | 5 | 4 | 3 | 1 | 2 | 1 | 1 | 2 | 3 | 0 | 1 | 8 | 5 | 7 | 4 | 2 | 5 | 7 | 7 | 3 | 8 |
| P | 9 | 5 | 7 | 7 | 7 | 6 | 5 | 4 | 2 | 3 | 2 | 1 | 3 | 4 | 1 | 0 | 9 | 6 | 8 | 5 | 3 | 6 | 8 | 8 | 4 | 9 |
| Q | 1 | 6 | 4 | 3 | 2 | 4 | 5 | 6 | 7 | 7 | 8 | 9 | 8 | 7 | 8 | 9 | 0 | 3 | 1 | 4 | 6 | 5 | 1 | 4 | 5 | 3 |
| R | 3 | 3 | 2 | 1 | 1 | 1 | 2 | 3 | 4 | 4 | 5 | 6 | 5 | 4 | 5 | 6 | 3 | 0 | 2 | 1 | 3 | 2 | 2 | 3 | 2 | 4 |
| S | 1 | 4 | 2 | 1 | 1 | 2 | 3 | 4 | 6 | 5 | 6 | 7 | 6 | 5 | 7 | 8 | 1 | 2 | 0 | 3 | 5 | 3 | 1 | 1 | 4 | 1 |
| T | 4 | 2 | 2 | 2 | 2 | 1 | 1 | 2 | 4 | 3 | 4 | 5 | 4 | 3 | 4 | 5 | 4 | 1 | 3 | 0 | 2 | 2 | 3 | 3 | 1 | 4 |
| U | 6 | 2 | 4 | 4 | 4 | 3 | 2 | 1 | 1 | 1 | 2 | 3 | 2 | 2 | 2 | 3 | 6 | 3 | 5 | 2 | 0 | 3 | 5 | 5 | 1 | 6 |
| V | 4 | 1 | 1 | 2 | 3 | 1 | 1 | 2 | 4 | 3 | 4 | 5 | 3 | 2 | 5 | 6 | 5 | 2 | 3 | 2 | 3 | 0 | 4 | 2 | 2 | 3 |
| W | 1 | 5 | 3 | 2 | 1 | 3 | 4 | 5 | 6 | 6 | 7 | 8 | 7 | 6 | 7 | 8 | 1 | 2 | 1 | 3 | 5 | 4 | 0 | 2 | 4 | 2 |
| X | 2 | 3 | 1 | 1 | 2 | 2 | 3 | 4 | 6 | 5 | 6 | 7 | 5 | 4 | 7 | 8 | 4 | 3 | 1 | 3 | 5 | 2 | 2 | 0 | 4 | 1 |
| Y | 5 | 2 | 3 | 3 | 3 | 2 | 1 | 1 | 2 | 2 | 3 | 4 | 3 | 2 | 3 | 4 | 5 | 2 | 4 | 1 | 1 | 2 | 4 | 4 | 0 | 5 |
| Z | 1 | 4 | 2 | 2 | 2 | 3 | 4 | 5 | 7 | 6 | 7 | 8 | 6 | 5 | 8 | 9 | 3 | 4 | 1 | 4 | 6 | 3 | 2 | 1 | 5 | 0 |

600

METHOD AND APPARATUS FOR DETECTING PASSWORD ATTACKS USING MODELING TECHNIQUES

TECHNICAL FIELD

The present invention relates generally to computer security and, more specifically, to a system and method for distinguishing a password that has been incorrectly entered from one that represents a deliberate intrusion attempt.

BACKGROUND OF THE INVENTION

As computers have become increasingly interconnected via networks such as the Internet, many computing devices have been increasingly vulnerable to access by unauthorized users. Unauthorized users, or "hackers," are continually using more intelligent and sophisticated methods of breaking into computer users' accounts than previously encountered by computer security personnel. To guard against hackers, counterintelligence methods must, by necessity, also must become more intelligent and sophisticated.

Since hackers often make multiple attempts to login to a targeted computer by randomly trying each of a list of commonly used passwords, one important counterintelligence method is the recognition of false passwords. One current method of detecting false passwords is to look for "alert" passwords, or those likely to be included in such a list of commonly used passwords. Although alert passwords can reduce false positives with respect to detecting break-in attempts, the method may also produce an unacceptable number of false negatives.

Other false password detection methods include analysis of the timing of keystrokes or other keystroke dynamics of password attempts. For example, some of these types of biometric authentication techniques examine the duration of and latency between keystrokes during password entry. However, these methods do not compare entered passwords to actual stored, valid passwords.

SUMMARY OF THE INVENTION

Provided is an apparatus and method for detecting, in real-time, false or fraudulent passwords so that deliberate computer break-in attempts using multiple passwords can be distinguished from authorized users incorrectly entering their passwords. An actual password is mapped against a computer keyboard and the resultant data, or "mapping profile," is stored in memory. As a login attempt is made, the profile of the entered password is compared to the stored profile. If the mapping profile of the entered password differs significantly from the stored profile, then the login attempt is flagged as an attempted intrusion and appropriate procedures are triggered. Such procedures may include such actions as shutting down the corresponding connection, logging the attempt and notifying security personnel.

In one embodiment of the current invention, passwords are mapped according to the distance subsequent keystrokes are from each other on the standard Qwerty keyboard. For example, since the letter 's' is one key from the letter 'd' on a standard keyboard, the password "sd1" would have initial mapping data of '1'. Since the number '1' is 4 keys from the letter 'd', the data map would then become "1/4." Uppercase and lower case of the same letter are separated by one half (0.5). Therefore, if a user types the string "sD1" rather than "sd1", the profile of the new string is "1/4.5" rather than "1/4". If the difference between the two profiles is greater than a predetermined threshold, then the password attempt is flagged as a possible break-in attempt and appropriate action is initiated. The difference in the upper/lower case example is small enough to indicate a mistyped password rather than a break-in attempt.

Different embodiments may have different mapping schemes. For example, mapping data may correspond to statistical data that corresponds to the likelihood that a particular character is typed by mistake when another particular character is intended.

BRIEF DESCRIPTION OF THE FIGURES

A better understanding of the present invention can be obtained when the following detailed description of the disclosed embodiments is considered in conjunction with the following drawings, in which:

FIG. 3 is a chart showing an exemplary mapping among the keys of the keyboard of FIGS. 1 and 2;

DETAILED DESCRIPTION OF THE PREFERRED EMBODIMENT

Figure 1:
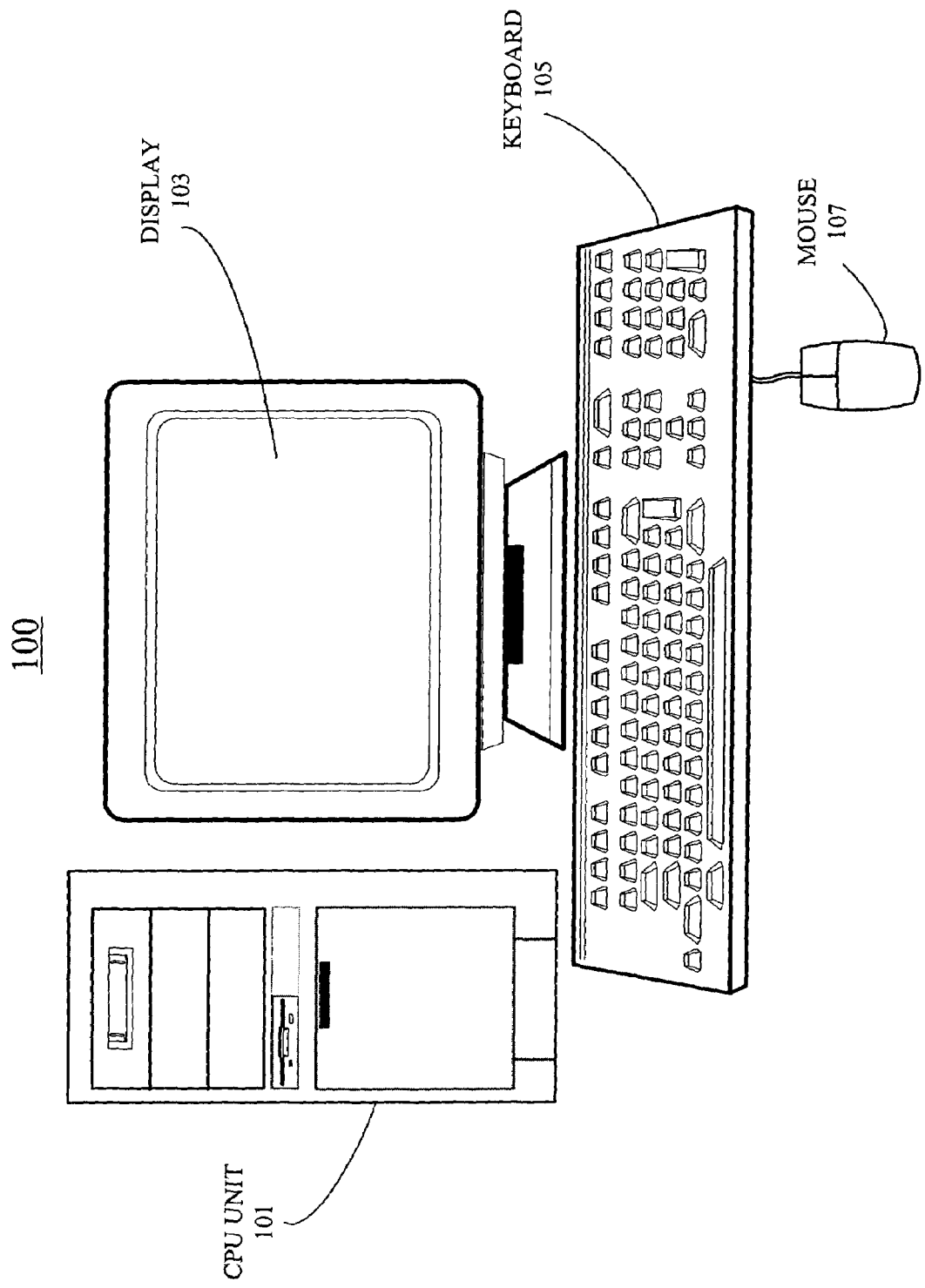
FIG. 1 is a block diagram of an exemplary computing system implementing the claimed subject matter.

Although described with particular reference to a technique for providing security for a computer log-in process, apparatus and method of the disclosed embodiment can be implemented in any system where password protection is implemented. FIG. 1 illustrates an exemplary computer in which the system according to the present invention is implemented. The claimed subject matter is also relevant, but not limited, to such things as telephone message storage and retrieval systems, automated voice response systems, controlled access environments and network access situations. Those with skill in the computing arts will recognize that the disclosed embodiments have relevance to a wide variety of devices and situations in addition to those described below.

In addition, the present invention can be implemented in software, hardware, or a combination of software and hardware. The hardware portion can be implemented using specialized logic; the software portion can be stored in memory and executed by a suitable instruction execution system such as a microprocessor.

FIG. 1 is a block diagram of an exemplary computing system 100 implementing the claimed subject matter. Computing system 100 includes a central processing unit ("CPU") unit 101, which includes memory (not shown) and a processor (not shown). Coupled to CPU unit 101 is a display 103, a keyboard 105 and a mouse 107. Display 103, keyboard 105 and mouse 107, which should be familiar to those with skill in the computing arts, enable human interaction with the CPU unit 101. Computing system 100 could also include connections to a network (not shown) and/or the public telephone system (not shown).

Figure 2:
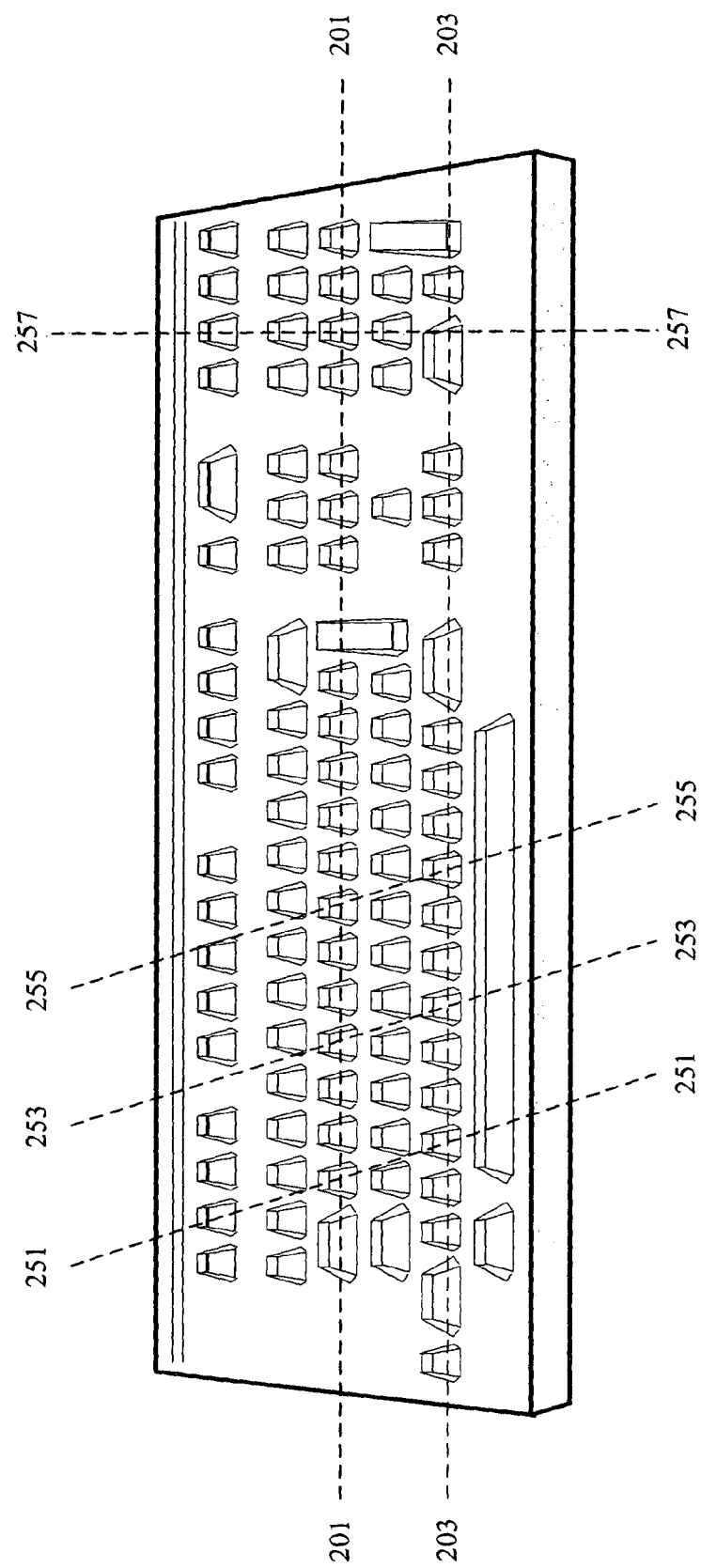
FIG. 2 is a block diagram showing a larger view of the keyboard of FIG. 1.

FIG. 2 is a block diagram showing a larger view of keyboard 105 of FIG. 1. Superimposed on keyboard 105 are several grid lines, two (2) horizontal grid lines 201 and 203 and four (4) vertical grid lines 251, 253, 255 and 257, to facilitate the discussion of individual keys. Grid lines 201, 203, 251, 253, 255 and 257 are not part of keyboard 105 but are drawn simply to held locate a few keys used in the following examples.

In this example, keyboard 105 is a "Qwerty" keyboard, a common type of keyboard named after letters in the top row of letters. In keyboard 105, as in any typical Qwerty keyboard, the key at the intersection of grid line 201 and grid line 252 is the key representing the letter 'Q', or the "Q-key." The key at the intersection of grid lines 203 and 251 is the "Z-key;" at the intersection of grid lines 201 and 253 is the "R-key;" at the intersection of grid lines 203 and 253 is the "V-key;" at the intersection of grid lines 201 and 255 is the "U-key;" and at the intersection of grid lines 203 and 255 is the "M-key." In addition, at the intersection of grid line 201 and grid line 257 is a key representing the number '2', or the "2-key." It should be noted that for the sake of simplicity only a few of the keys on keyboard 105 are described individually.

Relevant to one embodiment of the claimed subject matter is the number of keys in between any two individual keys. For example, to get from the Z-key (203, 251) to the V-key (203, 253), there are three (3) "steps;" between the Q-key (201, 251) and the R-key (201, 253) there are three (3) steps; between the Q-key (201, 251) and the U-key (201, 255) there are six (6) steps; and between the Q-key (201, 251) and the M-key (203, 255) there are eight (8) steps. It should be noted that the 2-key (201, 257) is at some distance from the other keys. Instead of using the illustrated 2-key (203, 257), this embodiment would map the 2-key (203, 257) to an additional 2-key in the row above row marked by grid line 201.

FIG. 3 is a chart showing an exemplary mapping, or matrix, 300 based upon the keys of keyboard 105 of FIGS. 1 and 2. Matrix 300 shows the number of steps between each letter key of keyboard 105 and each other letter key. For example, as explained in conjunction with FIG. 2, the number of steps between the Q-key (201, 251) and the R-key (201, 253) is three (3). Therefore, the number at the intersection of the 'Q' row and the 'R' column in matrix 300 is three (3). The number of steps between the Q-key (201, 251) and the M-key (203, 255) is eight (8). Therefore, at the intersection of the 'Q' row and 'M' row of matrix 300 is the number '8'. The remaining numbers in matrix 300 should be self-explanatory.

It should be noted that even though matrix 300 includes only the uppercase letters A-Z, the disclosed subject matter includes the relationships among all the character keys on keyboard 105, including number keys, such as the 2-key (203, 257), punctuation mark keys and special character keys. In an actual matrix, any key that can be used as part of a password is included in the matrix. In addition, special consideration is used in case sensitive password schemes for whether or not any particular typed character is upper or lower case.

The actual values within matrix 300 are based upon a simple "number-of-steps" calculation but, in the alternative, could be based upon any number of methods. For example, each value could be the square root of the number of steps or some other value based upon a statistical probability that a person typing particular character will accidentally type another particular character. In addition, any value based upon whether or not a particular letter is upper rather than lower case, or vice versa, should take into account the frequency the mistake is made, such as by assigning a value, in line with the values in matrix 300, of one half (0.5).

Figure 4:
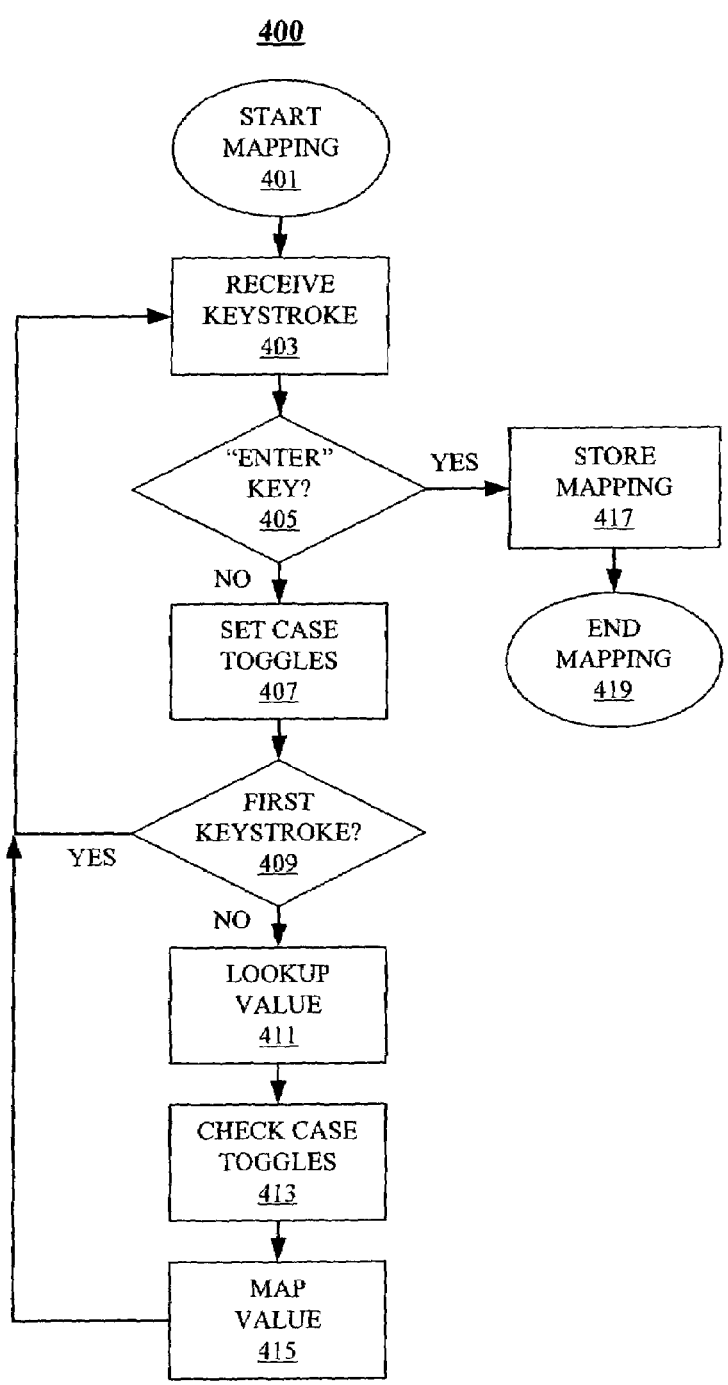
FIG. 4 is a flow chart showing a mapping process of the claimed subject matter.

FIG. 4 is a flow chart showing a mapping process 400 that assigns a mapping profile to a particular password. For this example, assume a user is creating the password "seCret" for use with a computer account on computer 101 (FIG. 1). It should be noted that the claimed technique is not limited to computer accounts but could also be employed in any circumstances where a password or pass code is used, such as, but not limited to, telephone message storage and retrieval systems, automated voice response systems, controlled access environments and network access situations.

Mapping process 400 begins in a "Start Mapping" step 401 and control proceeds immediately to a "Receive Keystroke" step 403 in which the user enters a letter, or in this example the first letter in the exemplary pass word, the letter 's', on keyboard 105. Control then proceeds to an "'Enter' Key?" step 405 in which process 400 determines if the received keystroke is the "Enter" key, indicating the user has finished typing the password. The Enter key is typically used to indicate the user has finished typing the password but other indications are detected in step 405 as well. For example, the user may use mouse 107 (FIG. 1) to click on a "Login" icon (not shown) on display 103 (FIG. 1).

If, in step 405, the received keystroke is not the Enter key or another indication of the end of the password, then Control proceeds to a "Set Case Toggles" step 407 in which one of two memory locations are set to indicate whether the received character is upper or lower case. In this example, the letter 's' is lower case so a "current case" toggle (not shown) is set to a value representing lower case. Prior to setting the current case toggle, the current value of the current case toggle is saved in a "previous case" toggle (not shown). In this manner, the respective cases of two successive received letters may by compared later in process 400.

Control then proceeds to a "First Keystroke?" step 409 in which process 400 determines whether or not the keystroke received in step 403 is the first keystroke entered. Since, in this example, the mapping is based upon the distance between keystrokes, it is necessary to have at least two keystrokes to compare. If the received keystroke is the first keystroke for this particular password, then control returns to step 403 in which another keystroke, in this example the letter 'e', is received and control returns again to step 405 and proceeds as explained above. This time when control returns to step 409, the letter 'e' is not the first keystroke, so control proceeds to a "Lookup Value" step 411 in which matrix 300 (FIG. 3) is consulted.

According to matrix 300, the value of the mapping from the letter 's' to the letter 'e' is equal to '1'. Of course, this example is a simple example of one of many types of processes that could be employed to perform the mapping of the characters in a password. Once the appropriate value from matrix 300 is determined in step 411, control proceeds to a "Check Case Toggles" step 413 in which current case and previous case toggles are compared. If the toggles hold different values, indicating that a change in case has occurred, the value determined in step 411 is adjusted accordingly. Control then proceeds to a "Map Value" step 415 in which the value '1', corresponding to the value retrieved from matrix 300 in step 409 as adjusted in step 413, is stored in the current memory map.

Control then returns to Receive Keystroke step 403 and processing proceeds as explained above. In the next iteration of process 400, the keystroke received in step 403 is the letter 'C', control goes from step 405 to step 407 in which the previous case toggle is set to a value corresponding to lower case (the case of the letter 'e') and the current case toggle is set to a value corresponding to upper case (the case of the letter 'C'). Control then proceeds from step 409 to step 411 in which the matrix 300 is consulted to determine the next value in the mapping to be '2'. Next, in step 413 the value of '2' is adjusted because the two toggles contain different values.

Since typing the wrong case is a common error, the amount of the adjustment in this example is '0.5', adjusting the value of the mapping between the current letter 'C' and the previous letter 'e' to '2.5' from '2'. In step 415, the mapped value then becomes "1/2.5". Of course if the storage of the mapping is based upon integers rather than real numbers, all the values in matrix 300 could be doubled and the adjustment for two successive letters of different cases set to the value of '1'. Then the current value of the mapping would become simply "2/5".

Continuing process 400 with the rest of the example password 'seCret' produces a mapping for the password of "1/2.5/2. 5/1/2". Once the final letter 't' is entered and mapped and the user indicates the end of the password by typing the Enter key or clicking on a Login icon, control proceeds from step 405 to a "Store Mapping" step 417 in which the mapping produced, in this case "1/2.5/2.5/1/2", is stored in memory (not shown) on computer 101 for use in the login process described below in conjunction with FIG. 5.

Figure 5:
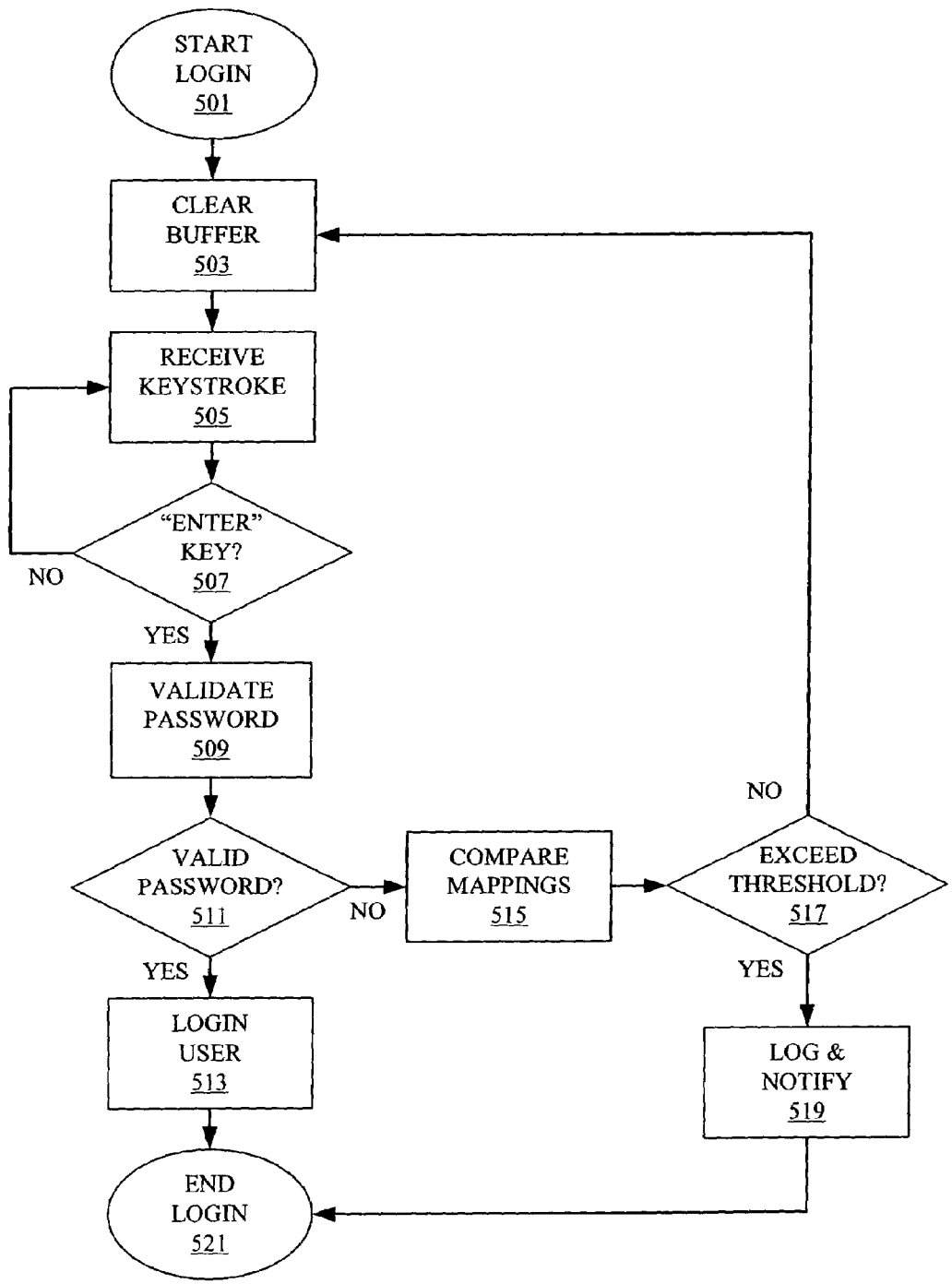
FIG. 5 is a flow chart showing a login process of the claimed subject matter.

FIG. 5 is a flow chart showing a Login process 500 that occurs when a user types a password in an attempt to login to computer system 100 (FIG. 1). Login process 500 begins in a "Start Login" step 501 and proceeds immediately to a "Clear Buffer" step 503 in which a memory buffer (not shown) is cleared of any data left from previous password entry attempts. Control then proceeds to a "Receive Keystroke" step 505 in which a key typed on keyboard 105 (FIGS. 1 and 2) is stored in the buffer cleared in step 503. Control then proceeds to a "Enter Key?" step 507 in which process 500 determines whether or not the keystroke received in step 505 represents a signal that entry of the password is completed. As explained above in conjunction with FIG. 4, the end of password signal may be indicated by the user typing the Enter key or clicking on a Login icon. If the keystroke received in step 505 is not an end of password signal, then control returns to step 505 in which another keystroke is received and appended to characters already in the buffer. By looping through steps 505, and 507, the entire password is eventually stored in the buffer initially cleared in step 503.

Once an end of password signal is received in step 507, control proceeds to a "Validate Password" step 509 in which the password stored in the buffer is compared to a valid password, which is stored in memory, for the corresponding user. Control then proceeds to a "Valid Password?" step 511 in which, if the password entered in steps 503 and 505 is determined to be valid, then control proceeds to a "Login User" step 513 in which the user is allowed access to computer 101 and then to a "End Login" step in which process 500 is complete.

If, in step 511, the password in the buffer does not match the password stored in memory, then control proceeds to a "Compare Mappings" step 515, which is explained in more detail below in conjunction with FIG. 6. As explained below, step 515 produces a score based upon how closely the entered password matches the stored password. Control then proceeds to an "Exceed Threshold?" step 517 in which the score produced in step 515 is compared to a predetermined threshold value. The threshold value can be set according to how sensitive a system administrator desires to set the security system.

If the score exceeds the threshold value, then control proceeds to a "Log & Notify" step 519 in which process 500 takes appropriate action. Appropriate action may include logging a suspicious login attempt to a log file, notifying a system administrator of the attempt, both logging and notifying the administrator or any other action deemed necessary. If, in step 517, the score does not exceed the threshold, then control returns to Clear Buffer step 503 and the user is allowed to attempt to login again. Of course, safeguards may be put into place to spot numerous attempts that exceed a predetermined allowable number of failures, regardless of whether they score below the threshold value. For example, for each attempt the threshold value may be reduced.

Figure 6:
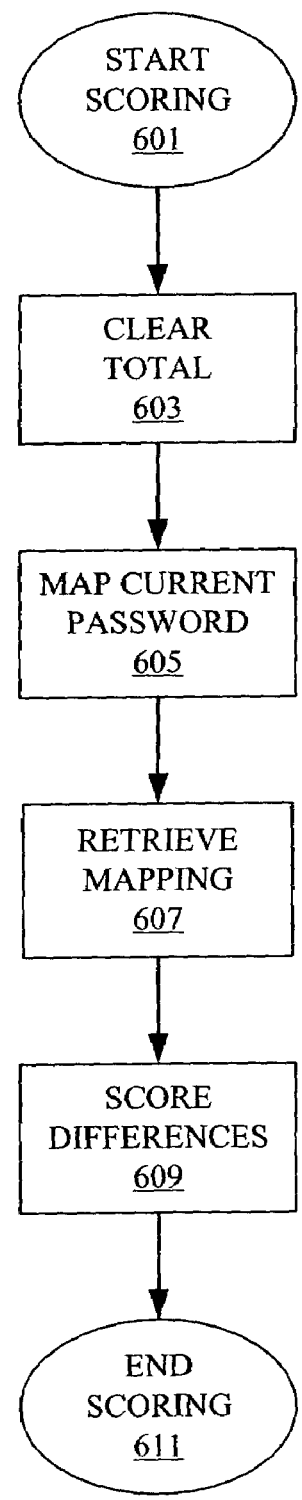
FIG. 6 is a flow chart showing a mapping comparison process of the claimed subject matter.

FIG. 6 is a flow chart showing a Mapping Comparison process 600 which corresponds to Compare Mappings step 515 of FIG. 5. Process 600 begins in a "Start Scoring" step 601 and proceeds immediately to a "Clear Total " step 603 in which a scoring buffer is set to a value of '0'. Control then proceeds to a "Map Current Password" step 605 in which the password entered in steps 505 and 507 of FIG. 5 is mapped in the same manner as described in steps 411, 413 and 415 of FIG. 4. Control then proceeds to a "Retrieve Mapping" step 607 in which the mapping corresponding to the stored, valid password, generated by process 400 is retrieved from memory.

Once process 600 has both the score generated for the current password and the stored mapping generated from the valid password, control proceeds to a "Score Differences" step 609 in which the two mappings are compared digit by digit. For example, if the user entered the password "secret" (without the capitol 'C'), then the current password would map to the digits "1/2/2/1/2" rather than the "1/2. 5/2.5/1/2" mapping of the valid password. The two mappings are compared digit by digit: the '1' is compared to the '1'; the '2' is compared to the '2.5'; and so on. In this example, the only digits that are different, the second and third digits, both vary by '0.5'. Adding up the differences provides a intermediate score for this password attempt equal to '1', which becomes the score compared to the threshold in step 517 (FIG. 5). If in step 517 the predetermined threshold is set equal to '2', then this password attempt is determined to be an inadvertent typing error rather than a deliberate break-in attempt. Finally, control proceeds to an "End Scoring" step 615 in which process 600 is complete.

Other embodiments of the claimed subject matter can add a step to process 600 that adjusts the score if a determination is made that the typed password differs from the stored, valid password because characters have been transposed; e.g. the user typed "seCert" rather than "seCret". Another embodiment may, as mentioned above, also calculate a threshold value based on such factors the number of logins that one user has attempted.

One advantage of separating deliberate password break-in attempts from innocent typing mistakes is that typing mistakes may happen often enough that security personnel could too busy to respond to every incident. By distinguishing deliberate attempts from typing mistakes, system administrators or other personnel can focus their attention on the problems that provide the highest chance of damage and the greatest security risk.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified steps performed in the same or a different order.

We claim:

1. A method of detecting intrusion attempts on a computing system, comprising:

creating a first mapping profile of a valid password, wherein the valid password is entered on a keyboard and the first mapping profile is dependent upon characters of the valid password;

storing the mapping profile in memory;

creating a second mapping profile of an entered password, wherein the entered password is entered on the keyboard and the second mapping profile is dependent upon characters of the entered password;

calculating a profile score by comparing the first mapping profile to the second mapping profile;

comparing the profile score to a threshold value; and classifying the entered profile into one of two or more security classifications based upon the comparison between the profile score and the threshold value; and wherein the first mapping and the second mapping each comprise:

comparing successive characters of the respective password;

assigning a value to each pair of successive characters based upon a keyboard characteristic corresponding to the pair of successive characters; and generating a password mapping for the respective password based upon the assigned values and wherein the keyboard characteristic is the distance between keys of the keyboard representing the pair of characters.

2. The method of claim 1, wherein at least one of the security classifications represents an intrusion attempt on the computing system.

3. The method of claim 1, wherein the second mapping further comprises:

comparing the valid password to the entered password; and determining when a pair of characters in the entered password are a transposition of a corresponding pair of letters in the valid password; and, when there is a transposition, adjusting the profile score.

4. The method of claim 1, wherein the computing system is a personal computer.

5. The method of claim 1, wherein the computing system is a telephone voice response system.

\* \* \* \* \*